US009063603B2

(12) United States Patent
Ding et al.

(10) Patent No.: US 9,063,603 B2
(45) Date of Patent: Jun. 23, 2015

(54) TOUCH DISPLAY DEVICE WITH PIXEL ELECTRODES AND SENSING PADS

(75) Inventors: Hua Ding, Xiamen (CN); Silu Yu, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 13/571,315

(22) Filed: Aug. 9, 2012

(65) Prior Publication Data
US 2013/0127747 A1    May 23, 2013

(30) Foreign Application Priority Data
Nov. 18, 2011    (CN) .......................... 2011 1 0379318

(51) Int. Cl.
*G06F 3/041*    (2006.01)
(52) U.S. Cl.
CPC ............ *G06F 3/0412* (2013.01); *G06F 3/0416* (2013.01); *G06F 2203/04103* (2013.01)
(58) Field of Classification Search
None
See application file for complete search history.

(56) References Cited

U.S. PATENT DOCUMENTS

| 5,677,744 | A | * | 10/1997 | Yoneda et al. ................... 349/12 |
| 5,847,690 | A | * | 12/1998 | Boie et al. ...................... 345/104 |
| 2008/0198140 | A1 | * | 8/2008 | Kinoshita et al. ............. 345/173 |
| 2011/0310032 | A1 | * | 12/2011 | Chen et al. ..................... 345/173 |

FOREIGN PATENT DOCUMENTS

| CN | 201218887 Y | 4/2009 |
| CN | 101467119 A | 6/2009 |
| TW | I278690 | 4/2007 |

* cited by examiner

*Primary Examiner* — David D Davis
(74) *Attorney, Agent, or Firm* — Gokalp Bayramoglu

(57) ABSTRACT

The present disclosure relates to a touch display device. The touch display device comprises a pixel control layer having a plurality of pixel electrodes, a touch sensing layer disposed corresponding to the pixel control layer, wherein the touch sensing layer comprises a plurality of sensing pads and each sensing pad corresponds to each pixel electrode, and a liquid crystal layer disposed between the pixel control layer and the touch sensing layer.

20 Claims, 5 Drawing Sheets

TOUCH DISPLAY DEVICE WITH PIXEL ELECTRODES AND SENSING PADS

This application claims the benefit of Chinese application No. 201110379318.1, filed on Nov. 18, 2011.

BACKGROUND OF THE DISCLOSURE

1. Field of the Disclosure

The present disclosure relates to an I/O (input/output) integrated device. More particularly, the present disclosure relates to a touch display device.

2. Description of the Related Art

In recent years, various consumer electronic products, portable electronic products such as personal digital assistants (PDAs), mobile phones and notebooks, and even personal computers and digital household appliance systems have gradually started using touch panels as interfaces for information communication between users and electronic devices. When using a touch panel, a user can perform operation and give instructions directly through the objects displayed on the screen, thereby providing a more humanized operation interface for the user. Moreover, design of existing electronic products is done keeping parameters such as weight, size, and thickness in mind, and therefore a display device integrated with a touch panel has gradually become a key component of various electronic products.

According to different structures, conventional touch display devices can be classified into external touch display devices and embedded touch display devices. For an external touch display device, besides a display panel, an independent touch panel also needs to be disposed on a display surface of the display panel, so when a user looks at an image shown in the display panel, a touch location can be sensed by the touch panel. An embedded touch display device integrates touch function into a display panel, so that the same display panel can perform both input, and output functions simultaneously, thereby reducing the overall thickness of a touch display device.

However, in conventional touch display devices, relationship between touch sensing elements in a touch panel and display elements in a display panel under the touch panel is not taken into consideration. Relationship among the touch sensing elements, light shielding area, and light transmitting areas, is also not considered and therefore under the light, at certain angles, a user can see the touch sensing elements, which reduces display quality of the touch display devices.

SUMMARY OF THE DISCLOSURE

The present disclosure provides a touch display device that uses relationship between touch sensing elements and display elements to solve the above-mentioned problem of the touch sensing elements affecting display image.

According to an embodiment of the present disclosure, a touch display device is provided. The touch display device comprises a pixel control layer having a plurality of pixel electrodes, a touch sensing layer disposed corresponding to the pixel control layer, wherein the touch sensing layer comprises a plurality of sensing pads and each sensing pad corresponds to each pixel electrode, and a liquid crystal layer disposed between the pixel control layer and the touch sensing layer.

For the touch display device of the present disclosure, each sensing pad corresponds to each pixel electrode, that is each sensing pad corresponds to an open area of a display panel so that patterns of the sensing pads do not affect image displayed underneath, thereby achieving visual consistency.

BRIEF DESCRIPTION OF THE DRAWINGS

For those skilled in the art to understand the present disclosure, numerous embodiments are described below, annexing drawings to minutely illustrate the matters of the disclosure and the purpose thereof.

DETAILED DESCRIPTION OF THE EMBODIMENTS

A touch display device provided in the present disclosure comprises a pixel control layer and a touch sensing layer disposed corresponding to the pixel control layer, wherein the pixel control layer comprises a plurality of pixel electrodes, the touch sensing layer comprises a plurality of sensing pads, and each sensing pad corresponds to each pixel electrode. If the touch display device is an external touch display device, the pixel control is disposed inside a display panel and the touch sensing layer is disposed inside a touch panel, whereas if the touch display device is an embedded touch display device, the pixel control layer and the touch sensing layer are both disposed inside a display panel.

Figure 1:
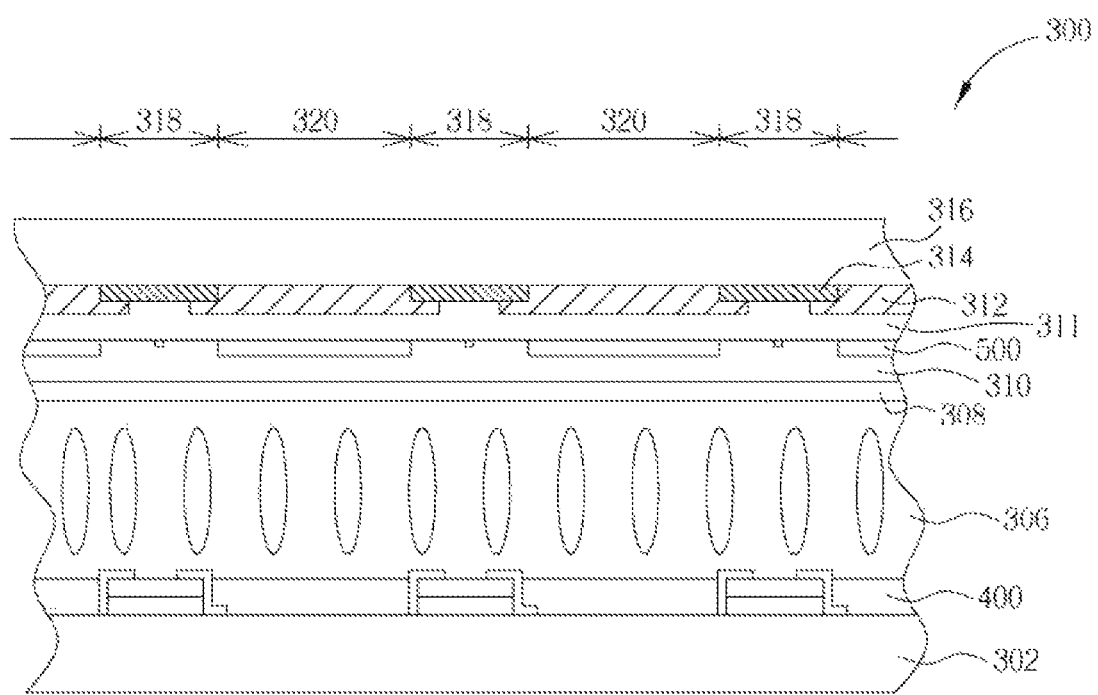
FIG. 1 is a schematic view of a touch display device in accordance with a first embodiment of the present disclosure.

FIG. 1 is a schematic structure view of a touch display device in accordance with the first embodiment of the present disclosure. As shown in FIG. 1, a touch display device 300 of the present embodiment comprises a first substrate 302, a pixel control layer 400, a liquid crystal layer 306, a common electrode layer 308, a touch sensing layer 500, a plurality of color filters 312, a black matrix 314, and a second substrate 316 in order from bottom to top.

The first substrate 302 is disposed corresponding to and approximately paralleled to the second substrate 316. The first substrate 302 and the second substrate 316 can be various transparent flexible substrates or transparent rigid substrates such as glass substrates, plastic substrates or quartz substrates. In the present embodiment, the first substrate 302 is a thin film transistor (TFT) substrate.

Figure 2:
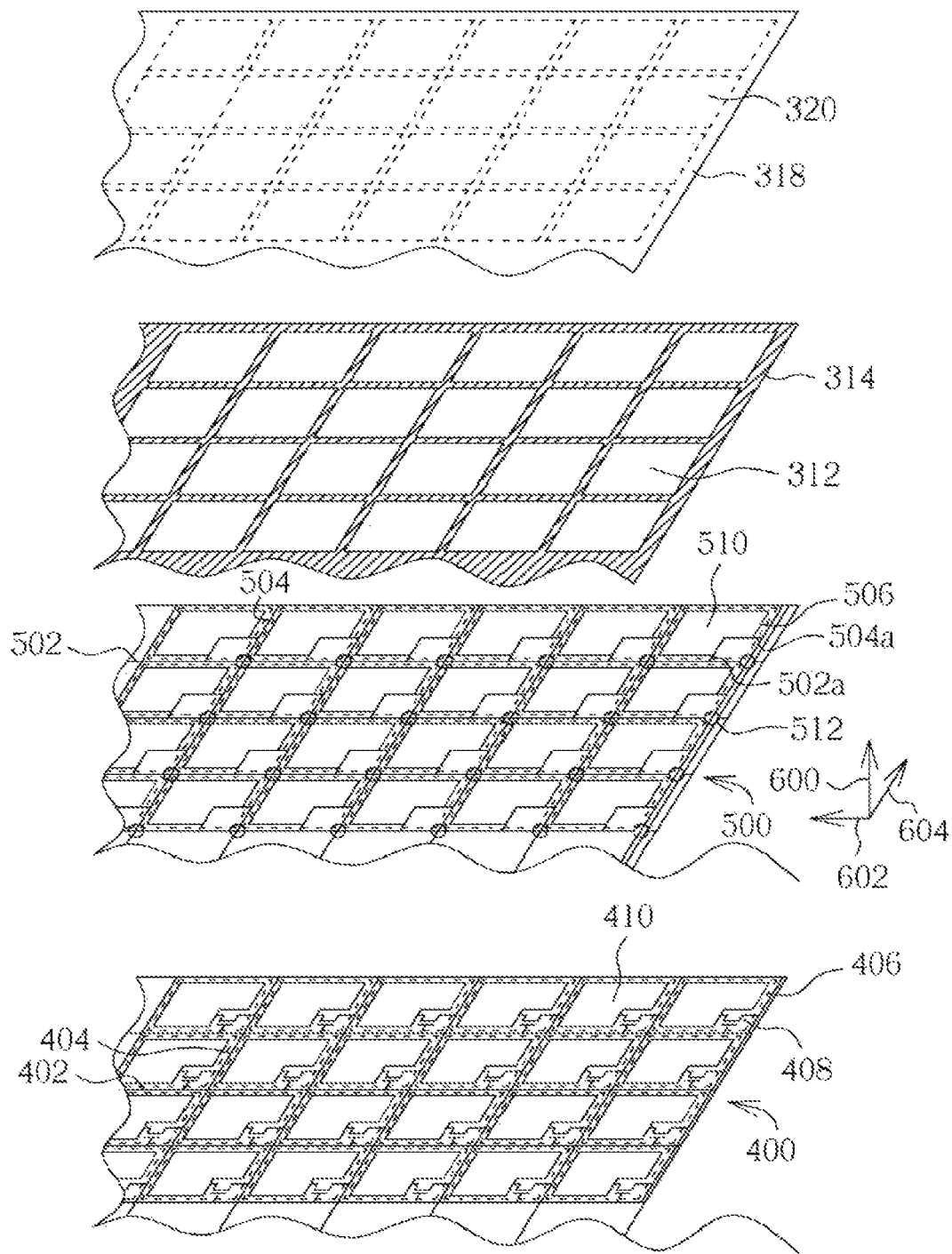
FIG. 2 is a schematic exploded view of a touch display device in accordance with the first embodiment of the present disclosure.

FIG. 2 is a schematic exploded view of a touch display device 300 in accordance with the present disclosure. In order to show it clearly, FIG. 2 only shows a pixel control layer 400, a touch sensing layer 500, color filters 312, and a black matrix 314. Besides, a first direction 600 (such as Z-axis), a second direction 602 (such as X-axis), and a third direction 604 (such as Y-axis) are defined in FIG. 2, and according to the position of the black matrix 314, a light shielding area 318, and a plurality of light transmitting areas 320 are partitioned on the plane of the second direction 602 and the third direction 604 (namely XY-plane). Position where the black matrix 314 is located is a light shielding area 318, and positions not covered by the black matrix 314 are the plurality of light transmitting areas 320. The color filters 312 are disposed correspondingly in the light transmitting areas 320.

The pixel control layer 400 is disposed on the first substrate 302, having electronic elements, which can drive the liquid crystal layer 306. As shown in FIG. 2, the pixel control layer 400 of the present embodiment comprises a plurality of scanning lines 402, a plurality of data lines 404, a plurality of thin film transistors (TFT) 408, and a plurality of pixel electrodes 410. The scanning lines 402 are approximately paralleled to each other and extend along the second direction 602. The data lines 404 are approximately paralleled to each other and extend along the third direction 604, wherein the scanning lines 402 are interlaced with the data lines 404 such that a plurality of pixel areas 406 are defined on the plane of the second direction 602 and the third direction 604. In the present embodiment, each pixel area 406 has a thin film transistor 408 and a pixel electrode 410 which are electrically connected. According to the signals provided by each scanning line 402 and each data line 404, the thin film transistor 408 in the corresponding pixel area 406 can be opened to conduct the pixel electrode 410 to which it is connected. In the present embodiment, the scanning lines 402 and the data lines 404 are made of a conductive material with low resistance, wherein the preferable material is metal, such as Au, Ag, Cu, Al, Mo, Ti, Ta, Cd or their nitrides, their oxides, their alloys or their combinations and it is not limited thereto. The pixel electrode 410 can be a single-layer structure or a multi-layer structure and made of a material or multiple materials, wherein the material includes transparent conductive material such as indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMaO) or indium gallium aluminum oxide (InGaAlO), but it is not limited thereto.

The touch sensing layer 500 is disposed on the common electrode layer 308. For detailed structure of the touch sensing layer 500, please refer to FIG. 2. As shown in FIG. 2, the touch sensing layer 500 comprises a plurality of first conductive wires 502, a plurality of second conductive wires 504, a plurality of sensing pads 510, and a plurality of insulation blocks 512. In a preferable embodiment of the present disclosure, the first conductive wires 502 are approximately paralleled to each other and extend along the second direction 602. The second conductive wires 504 are approximately paralleled to each other and extend along the third direction 604, wherein the first conductive wires 502 are interlaced with the second conductive wires 504 such that a plurality of sensing pad areas 506 are defined on the plane of the second direction 602 and the third direction 604. Each sensing pad area 506 has a sensing pad 510. As shown in FIG. 2, each sensing pad 510 is connected to one of the first conductive wires 502 and one of the second conductive wires 504 respectively. In a preferable embodiment of the present disclosure, each sensing pad 510 is electrically connected to one of the first conductive wires 502 by a first pilot wire 502a and electrically connected to one of the second conductive wires 504 by a second pilot wire 504a. In an embodiment, the first pilot wire 502a is approximately paralleled to the third direction 604, and the second pilot wire 504a is approximately paralleled to the second direction 602. The insulation blocks 512 are disposed at the junctions of the first conductive wires 502 and the second conductive wires 504 such that the first conductive wires 502 are electrically insulated from the second conductive wires 504. In an embodiment, the first conductive wires 502 cross over the insulation blocks 512 while the second conductive wires 504 are disposed under the insulation blocks. In another embodiment, the first conductive wires 502 are disposed under the insulation blocks 512 while the second conductive wires 504 cross over the insulation blocks 512. In a preferable embodiment of the present disclosure, the sensing pads 510 are made of a transparent conductive material and the first conductive wires 502 and the second conductive wires 504 are made of a conductive material having low resistance, wherein the preferable material is a metal. The insulation blocks 512 can be made of an insulating material such as $SiO_2$, SiN, SiCN or SiC, but it is not limited thereto.

The touch sensing layer 500 of the present embodiment has a special operation mode. For example, the first conductive wires 502 and the second conductive wires 504 are connected to a controller (not shown), wherein the controller provides sensing signals to the first conductive wires 502 and the second conductive wires 504 at different times to detect the touch situations of the sensing pads 510 respectively. In a first time mode, the controller provides a sensing signal to the first conductive wires 502 but cuts off the second conductive wires 504 so that there is no sensing signal in the second conductive wires 504, and then the sensing pads 510 can sense the touch location in the third direction 604 through the first conductive wires 502. Next, the controller judges whether the sensing pads 510 have sensed the touch location or not and if the result is yes, next step will be performed. If the result is no, the controller will continue to provide a sensing signal to the first conductive wires 502.

In a second time mode for the next step, the controller provides a sensing signal to the second conductive, wires 504 but cuts off the first conductive wires 502 so that there is no sensing signal in the first conductive wires 502, and then the sensing pads 510 can sense the touch location in the second direction 602 through the second conductive wires 504. Accordingly, in the circumstance of alternately performing the first time mode and the second time mode, the first conductive wires 502 and the second conductive wires 504 can share the sensing function of the sensing pads 510 such that the controller can detect the touch locations in the second direction 602 and in the third direction 604, thereby determining a correct touch location.

The touch sensing layer 500 of the present disclosure has a special structure, elements of which correspond to the elements of the pixel control layer 400 under it. As shown in FIG. 2, element disposition of the touch sensing layer 500 of the present embodiment is similar to that of the pixel control layer 400, and there is a corresponding relationship between the two layers in space. For example, positions of the pixel electrodes 410 in the pixel control layer 400 correspond to positions of the sensing pads 510 in the touch sensing layer 500, and both of the positions correspond to the light transmitting areas 320, namely, the pixel areas 406, the sensing pad areas 506, and the light transmitting areas 320 correspond to each other in the first direction 600. In a preferable embodiment of the present disclosure, shape of the pixel electrodes 410 is identical to that of the sensing pads 510, and projection of the pixel electrodes 410 in the first direction 600 overlaps with the projection of the sensing pads 510 in the first direction 600. Thus, for the touch display device 300 of the present disclosure, display image is not affected and display quality is not reduced due to inconsistency in pattern disposition of the sensing pads 510 and the pixel electrodes 410. In another embodiment of the present disclosure, disposition of the scanning lines 402 and the data lines 404 in the pixel control layer 400 also corresponds to the disposition of the first conductive wires 502 and the second conductive wires 504 in the touch sensing layer 500, and they are all located in the light shielding area 318 of the touch display device 300. Thus, the touch display device 300 of the present disclosure can achieve a maximal aperture ratio and a best display quality.

Referring to FIG. 1, the liquid crystal layer 306 of the present embodiment is disposed between the touch sensing layer 500 and the pixel control layer 400, wherein liquid crystal molecules are disposed in the liquid crystal layer 306. The liquid crystal molecules can be various types of liquid crystal materials, such as nematic liquid crystal, cholesteric liquid crystal or smectic liquid crystal, but it is not limited thereto. The common electrode layer 308 is disposed between the liquid crystal layer 306 and the touch sensing layer 500. Preferably, the common electrode layer 308 is a planar electrode fully covering the liquid crystal layer 306, and electrically connecting a common electrode signal (Vcom). In the present embodiment, the common electrode layer 308 is made of a transparent conductive material.

Further referring to FIG. 1, the black matrix 314 and the color filters 312 of the present embodiment are disposed above the touch sensing layer 500, opposite to the other side of the liquid crystal layer 306 and located between the second substrate 316 and the touch sensing layer 500. The black matrix 314 and the color filters 312 are disposed at a same layer. Material of the black matrix 314 can be selected from various kinds of light shielding materials such as metal or resin doped with dye in high light shielding color (such as black). The color filters 312 comprise a plurality of red filters, a plurality of green filters, and a plurality of blue filters, wherein the red filters, the green filters and the blue filters correspond to the pixel areas 406 respectively. In another embodiment of the present disclosure, a flat layer 311 can be selectively disposed among the color filters 312, the black matrix 314, and the touch sensing layer 500 such that the touch sensing layer 500 can be formed on a surface of the flat layer 311.

Moreover, as shown in FIG. 1, an insulation layer 310 can be disposed between the touch sensing layer 500 and the common electrode layer 308 such that the touch sensing layer 500 is insulated from the common electrode layer 308, wherein material of the insulation layer 310 can include organic material or inorganic material. For example, the organic material can be benzocyclobutene (BCB) or resin of cyclenes, polyimide, polyamide, polyester, polyol, polyethylene oxide, polyphenyl, polyether or polyketone, etc., and the inorganic material can be silicon oxide, silicon nitride, silicon oxynitride, silicon carbide or aluminum oxide, etc., but they are not limited thereto. In another embodiment of the present disclosure, the insulation layer 310 can also made of an insulating material, refractive index of which is approximate to that of the sensing pads 510. For example, if the sensing pads 510 are made of indium tin oxide (ITO), the insulation layer 310 can be made of titanium dioxide ($TiO_2$) or zirconium dioxide ($ZrO_2$). In another embodiment, a flat layer 304 can be selectively disposed between the touch sensing layer 500 and the common electrode layer 308.

Figure 3:
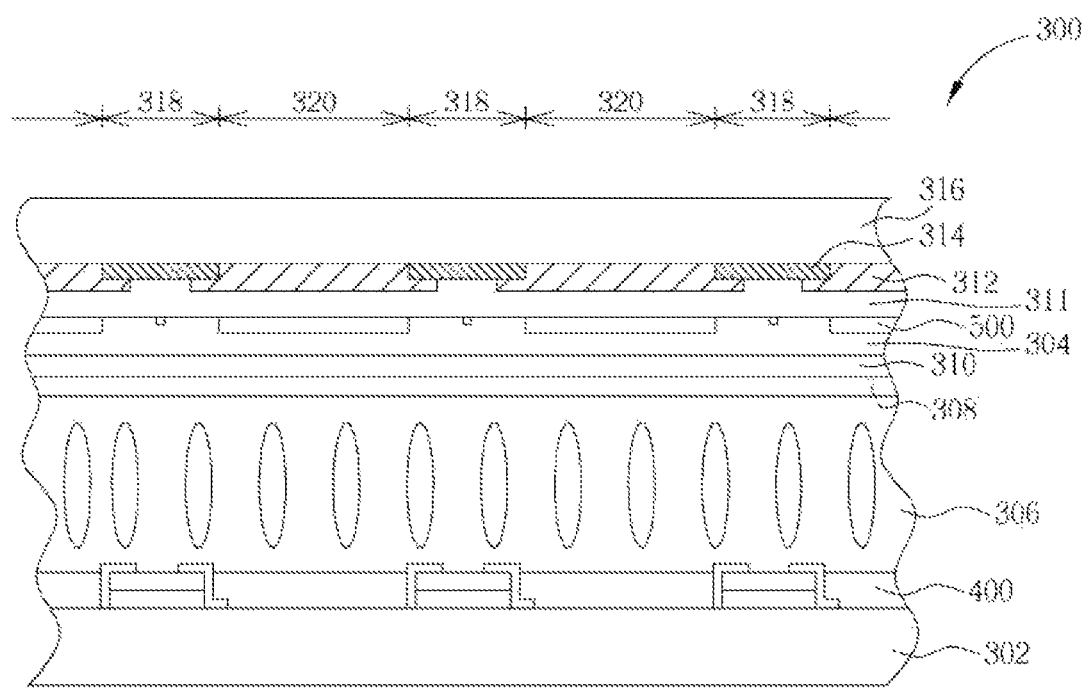
FIG. 3 is a schematic view of a touch display device in accordance with a second embodiment of the present disclosure.

FIG. 3 is a schematic view of a touch display device in accordance with a second embodiment of the present disclosure. As shown in FIG. 3, main structure of the second embodiment is similar to that of the first embodiment, wherein the difference includes but is not limited to: a flat layer 304 disposed between a touch sensing layer 500 and an insulation layer 310 such that the touch sensing layer 500 and the insulation layer 310 are well jointed. Materials, structures and operation modes of other elements similar to those of the first embodiment are similar to the description of the first embodiment, so no more description is made hereby.

Figure 4:
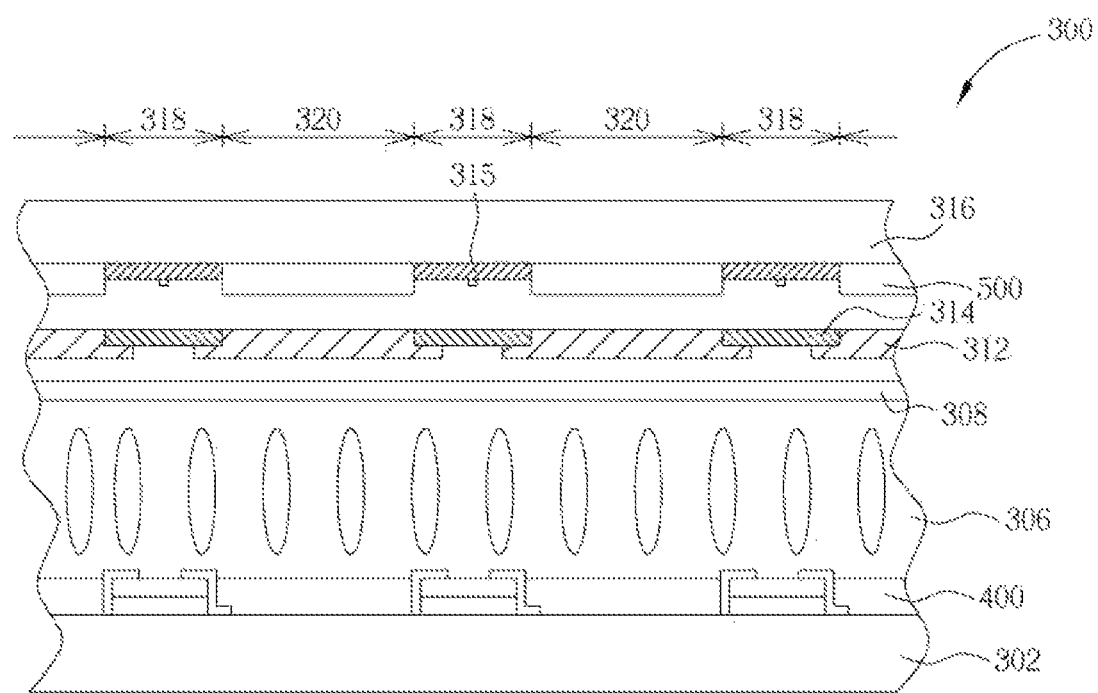
FIG. 4 is a schematic view of a touch display device in accordance with a third embodiment of the present disclosure.

FIG. 4 is a schematic view of a touch display device in accordance with a third embodiment of the present disclosure. As shown in FIG. 4, main structure of the third embodiment is similar to that of the first embodiment, wherein the difference includes but is not limited to: a touch sensing layer 500 of the present embodiment can be disposed between a second substrate 316 and color filters 312, wherein the color filters 312 are disposed correspondingly in light transmitting areas 320 and a black matrix 314 is disposed between the touch sensing layer 500 and a liquid crystal layer 306. In another preferable embodiment, the color filters 312 and the black matrix 314 are both disposed between the touch sensing layer 500 and the liquid crystal layer 306. A light shielding material layer 315 is additionally disposed above the touch sensing layer 500 and opposite to the other side of the liquid crystal layer 306 to shield conductive wire parts between the sensing pads of the touch sensing layer 500. In the present embodiment, the touch sensing layer 500 is comparatively close to the touch area (namely the second substrate 316) so that the touch display device 300 of the present disclosure achieves a good sensing effect. In the present embodiment, there is no need to dispose an insulation layer 310 between the touch sensing layer 500 and the common electrode layer 308. Besides, material of the light shielding material layer 315 is similar to or identical to that of the black matrix 314, both having an effect of light shielding. Thus, in another embodiment of the present disclosure, the black matrix 314 is not disposed at a same layer where the color filters 312 are located but is disposed above the conductive wire parts of the touch sensing layer 500 to omit the light shielding material layer 315. The touch sensing layer 500 can also be disposed at the other side of the second substrate 316 corresponding to the first substrate 302 such that the touch sensing layer 500 and the color filters 312 are disposed respectively at two sides of the second substrate 316 so that processes of the two parts are not interfered by each other. Materials, structures and operation modes of other elements similar to those of the first embodiment are similar to the description of the first embodiment, so no more description is made hereby.

Figure 5:
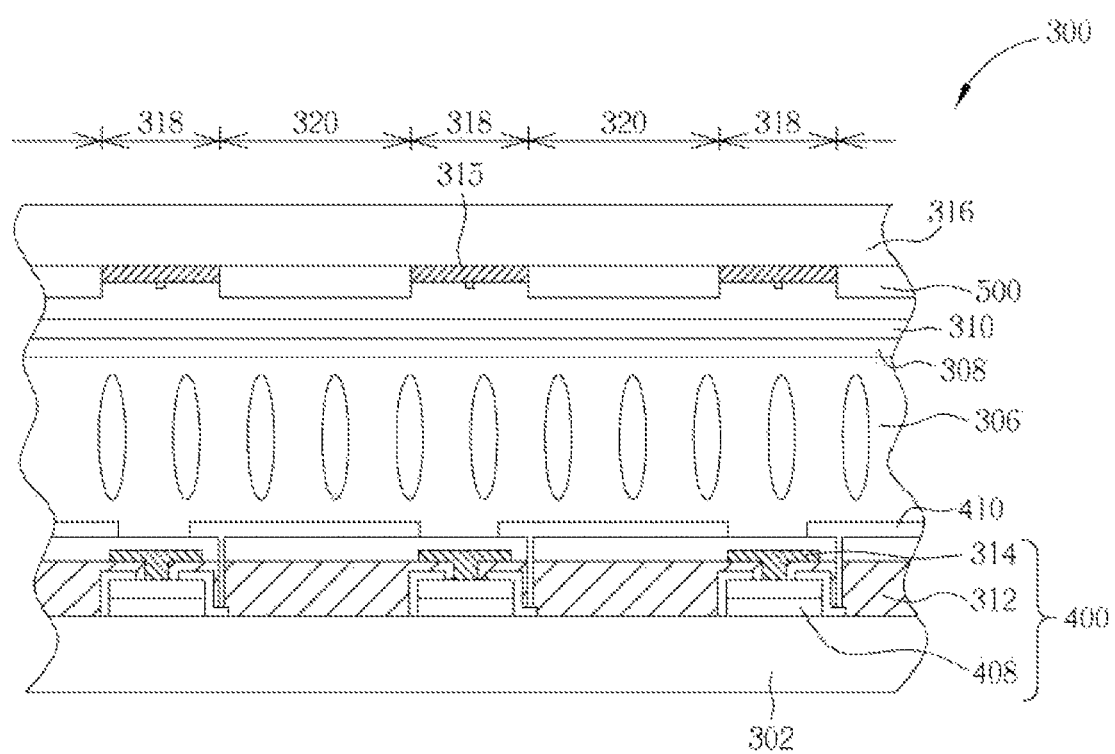
FIG. 5 is a schematic view of a touch display device in accordance with a fourth embodiment of the present disclosure.

FIG. 5 is a schematic view of a touch display device in accordance with a fourth embodiment of the present disclosure. As shown in FIG. 5, main structure of the fourth embodiment is similar to that of the first embodiment, wherein the difference includes but is not limited to: a first substrate 302 of a touch display device 300 of the present embodiment can also be a COA (color filter on array) substrate or a BOA (black matrix on array) substrate such that color filters 312 and/or a black matrix 314 can be integrated into a pixel control layer 400 on the first substrate 302. As shown in FIG. 5, the color filters 312 and the black matrix 314 are disposed between thin film transistors 408 and pixel electrodes 410 in the pixel control layer 400, and a light shielding material layer 315 is also additionally disposed above the touch sensing layer 500 to shield conductive wire parts between the sensing pads of the touch sensing layer 500. Thus, alignment of the color filters 312 and the pixel electrodes 410 can be more accurate. Moreover, the black matrix 314 can also not be disposed at a same layer where the color filters 312 are located but be disposed above the conductive wire parts of the touch sensing layer 500 to omit the light shielding material layer 315. Materials, structures and operation modes of other elements similar to those of the first embodiment are similar to the description of the first embodiment, so no more description is made hereby.

It should be noted that feature of the present disclosure lies in a corresponding relationship between the sensing pads 510 and the pixel electrodes 410 in stereoscopic space, and therefore in the circumstance of not affecting the display function or touch function, the pixel control layer 400 and the touch sensing layer 500 can have different dispositions but not limited to the embodiment shown in FIG. 2. For example, display mode of the touch display device 300 of the present disclosure can be applied to various display modes such as penetrable display panels, semi-penetrable display panels, reflective display panels, VA (vertical alignment) display panels, IPS (in-plane switching) display panels, MVA (multi-domain vertical alignment) display panels, TN (twisted nematic) display panels, STN (super twisted nematic) display panels, PVA (patterned-slit vertical alignment) display panels, S-PVA (super patterned-slit vertical alignment) display panels, ASV (advanced super view) display panels, FFS (fringe field switching) display panels, CPA (continuous pinwheel alignment) display panels, ASM (axially symmetric aligned micro-cell mode) display panels, OCB (optical compensation banded) display panels, S-IPS (super in-plane switching) display panels, AS-IPS (advanced super in-plane switching) display panels, UFFS (ultra-fringe field switching) display panels, polymer stable alignment display panels, electronic paper, blue phase display panels, dual-view display panels, triple-view display panels, three-dimensional display panels or other types of panels. In the circumstance of not affecting the display function, the touch sensing layer 500 can be disposed into various types of display panels and can be adjusted properly according to different conditions. For example, if display mode of the touch display device is an IPS (in-plane switching) panel, the common electrode layer 308 is disposed in the pixel control layer 400 so that there is no need to additionally dispose an insulation layer 310 between the common electrode layer 308 and the touch sensing layer 500, and which can reduce the overall thickness of the touch display device 300.

To sum up, the touch display device provided in the present disclosure can be applied to the existing panels of various display modes. Feature of the touch display device lies in that: sensing pads of a touch sensing layer correspond to pixel electrodes of a pixel control layer, and preferably, the sensing pads and the pixel electrodes are disposed correspondingly in light transmitting areas, thereby avoiding the problem that conventional touch sensing elements affect display image, achieving visual consistency and improving display quality.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch display device, comprising:
a pixel control layer having a plurality of pixel electrodes; and
a touch sensing layer disposed corresponding to the pixel control layer, wherein the touch sensing layer comprises a plurality of sensing pads, wherein each sensing pad corresponds to each pixel electrode, and wherein shape of the sensing pads is identical to shape of the pixel electrodes.

2. The touch display device as claimed in claim 1, further comprising a liquid crystal layer disposed between the pixel control layer and the touch sensing layer.

3. The touch display device as claimed in claim 2, wherein the black matrix is disposed at the other side of the touch sensing layer opposite to the liquid crystal layer.

4. The touch display device as claimed in claim 3, further comprising a plurality of color filters disposed correspondingly in the light transmitting areas.

5. The touch display device as claimed in claim 4, wherein the black matrix and the color filters are disposed at a same layer.

6. The touch display device as claimed in claim 5, wherein a common electrode layer is disposed between the touch sensing layer and the liquid crystal layer, and wherein an insulation layer is disposed between the common electrode layer and the touch sensing layer.

7. The touch display device as claimed in claim 4, wherein the color filters are disposed between the touch sensing layer and the liquid crystal layer.

8. The touch display device as claimed in claim 4, wherein the color filters are disposed in the pixel control layer.

9. The touch display device as claimed in claim 2, wherein the black matrix is disposed between the touch sensing layer and the liquid crystal layer.

10. The touch display device as claimed in claim 9, further comprising a light shielding material layer disposed at the other side of the touch sensing layer opposite to the liquid crystal layer.

11. The touch display device as claimed in claim 9, further comprising a plurality of color filters disposed correspondingly in the light transmitting areas, wherein the color filters and the black matrix are disposed at a same layer.

12. The touch display device as claimed in claim 2, wherein the black matrix is disposed in the pixel control layer.

13. The touch display device as claimed in claim 12, further comprising a plurality of color filters disposed correspondingly in the light transmitting areas, wherein the color filters and the black matrix are both disposed in the pixel control layer.

14. The touch display device as claimed in claim 12, further comprising a light shielding material layer disposed at the other side of the touch sensing layer opposite to the liquid crystal layer.

15. The touch display device as claimed in claim 2, wherein the touch display device is an IPS (in-plane switching) touch display device.

16. The touch display device as claimed in claim 1, wherein projection of the sensing pads in a first direction overlaps with projection of the pixel electrodes.

17. The touch display device as claimed in claim 1 further comprising:
a black matrix, wherein position where the black matrix is located forms a light shielding area and positions not covered by the black matrix form a plurality of light transmitting areas.

18. The touch display device as claimed in claim 1, wherein the touch sensing layer comprises:
a plurality of first conductive wires paralleled to each other and extending along a second direction;
a plurality of second conductive wires paralleled to each other and extending along a third direction, wherein the first conductive wires are interlaced with the second conductive wires to form a plurality of sensing pad areas; and
wherein each sensing pad is disposed in each sensing pad area and electrically connected to one of the first conductive wires and one of the second conductive wires.

19. The touch display device as claimed in claim 18, wherein the sensing pads are disposed correspondingly in the light transmitting areas, and wherein the first conductive wires and the second conductive wires are disposed in the light shielding area.

20. The touch display device as claimed in claim 1, wherein the touch display device further comprises a first substrate and a second substrate, wherein the pixel control layer and the touch sensing layer are placed between the first substrate and the second substrate.

* * * * *